(12) United States Patent
Thornton et al.

(10) Patent No.: US 7,194,183 B2
(45) Date of Patent: Mar. 20, 2007

(54) MODULAR RECEPTACLE ASSEMBLY AND INTERFACE WITH INTEGRAL OPTICAL INDICATION

(75) Inventors: Martin Q. Thornton, Lee, NH (US); Richard W. Graham, Derry, NH (US); Thomas A. Stewart, Meredith, NH (US); William M. Ferland, Somersworth, NH (US)

(73) Assignee: Enterasys Networks, Inc., Andover, MA (US)

( * ) Notice: Subject to any disclaimer, the term of this patent is extended or adjusted under 35 U.S.C. 154(b) by 258 days.

(21) Appl. No.: 10/737,652

(22) Filed: Dec. 17, 2003

(65) Prior Publication Data

US 2005/0063647 A1 Mar. 24, 2005

Related U.S. Application Data

(60) Provisional application No. 60/504,493, filed on Sep. 19, 2003.

(51) Int. Cl.
*G02B 6/42* (2006.01)
*H01R 11/03* (2006.01)
(52) U.S. Cl. .......................... 385/139; 385/89; 385/92; 439/490
(58) Field of Classification Search ...................... None
See application file for complete search history.

(56) References Cited

U.S. PATENT DOCUMENTS

| | | | |
|---|---|---|---|
| 5,613,873 A | 3/1997 | Bell, Jr. | |
| 5,790,041 A | 8/1998 | Lee | |
| 6,095,851 A | 8/2000 | Laity et al. | |
| 6,159,037 A | 12/2000 | Madsen et al. | |
| 6,224,417 B1 | 5/2001 | Belopolsky et al. | |
| 6,241,550 B1 | 6/2001 | Laity et al. | |
| 6,361,357 B1 | 3/2002 | Stillwell et al. | |
| 6,457,992 B2 * | 10/2002 | Posey et al. | ................ 439/490 |
| 6,483,712 B1 | 11/2002 | Oliphant et al. | |
| 2001/0027055 A1 | 10/2001 | Laity et al. | |

FOREIGN PATENT DOCUMENTS

| | | |
|---|---|---|
| WO | WO 95/26582 | 5/1995 |
| WO | WO 00/17968 | 3/2000 |
| WO | WO 00/26997 | 11/2000 |

* cited by examiner

*Primary Examiner*—Michelle Connelly-Cushwa
*Assistant Examiner*—Jerry T Rahll
(74) *Attorney, Agent, or Firm*—Sampson & Associates, P.C.

(57) ABSTRACT

A modular receptacle assembly includes integral optical indication. The receptacle assembly includes a module housing one or more receptacles configured to releasably receive, in an insertion direction, a leading portion of a modular plug. A light pipe having proximal and distal ends, is disposed in the footprint of the module. The proximal end is coupled to the receptacle, and the distal end is coupled to a light source. The proximal end is configured to radiate light onto the leading portion of a plug disposed within said receptacle. An actuator is configured to selectively operate the light pipe.

45 Claims, 9 Drawing Sheets

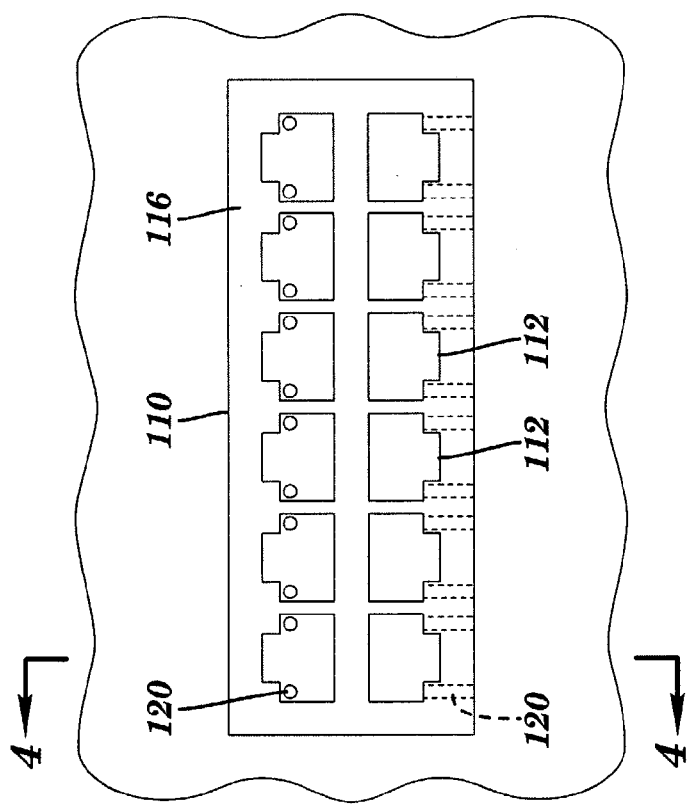
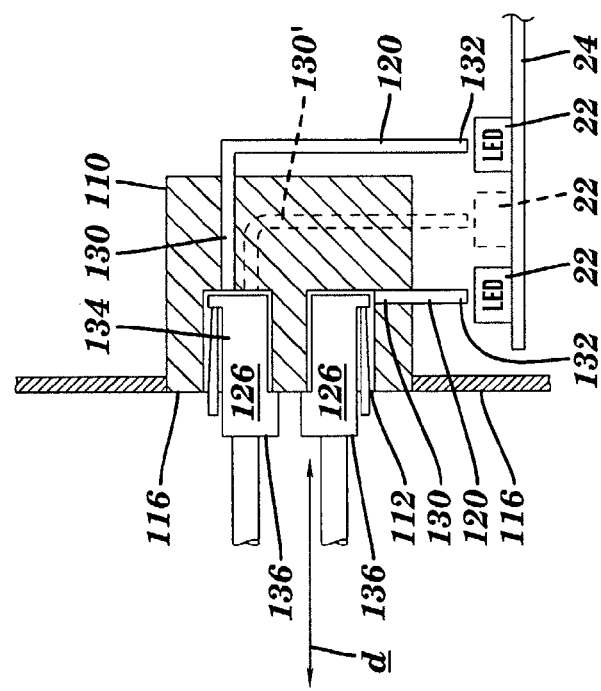
FIG. 3
FIG. 4

MODULAR RECEPTACLE ASSEMBLY AND INTERFACE WITH INTEGRAL OPTICAL INDICATION

RELATED APPLICATION

This application claims the benefit of U.S. Provisional Application Ser. No. 60/504,493, entitled MODULAR RECEPTACLE AND INTERFACE WITH INTEGRAL OPTICAL INDICATION, filed Sep. 19, 2003.

BACKGROUND

1. Technical Field

This invention relates to modular connectors, and more particularly to modular plug and socket connectors having integral optical displays for convenient status indication.

2. Background Information

Conventional double row, multiple receptacle RJ-45 (CAT 5) receptacle assemblies 10, such as shown in FIG. 1, are well-known. This particular example includes two stacked rows of six receptacles 12. A pair of optical indicators 14 are disposed in the face plane 16 of the receptacle assembly, proximate each receptacle 12. Optical indicators 14 are typically used for status indication.

Such location of indicators 14 proximate receptacles 12 was intended to improve upon earlier approaches in which status indicators were grouped together elsewhere on the face plane 16. The configuration shown advantageously enabled a user to more easily associate particular indicators 14 with their respective receptacles 12, while also freeing up valuable surface area on plane 16 for additional receptacles. Indicators 14 are typically LEDs (Light Emitting Diodes) of various colors mounted within face plane 16, or light pipes that terminate flush with face plane 16.

A drawback associated with face plane-mounted LEDs is that the electrical leads supplying power to them tend to generate electromagnetic (EM) noise that without compensation, may disrupt the signals flowing between the plugs 26 and receptacles 12.

A cross-section of a receptacle assembly 10 that utilizes light pipes is shown in FIG. 2. In this configuration, light pipes 20 extend between face plane 16 and one or more LEDs 22 disposed proximate each receptacle 12, e.g., on a circuit board 24. A modular plug 26 is shown engaged with each receptacle 12.

Use of these light pipes 20 tends to ameliorate the problem of EM noise by enabling the LEDs, and any electromagnetic noise generated thereby, to be located away from the plugs and receptacles. This approach, however, also has drawbacks. For example, the indicators 14 still take up valuable surface area on face plane 16, which inhibits the ability to further increase the density of receptacles 12 thereon. Concomitantly, it may be difficult and potentially expensive from a manufacturability standpoint, to provide sufficient clearance to extend the light pipes 20 all the way from a light source (e.g., LED 22) to the face plane 16 without binding or otherwise interfering with proper insertion/withdrawal of plug 26.

Other approaches for providing status indication include directly illuminating a translucent RJ-XX plug via a receptacle of a conventional PCMCIA card. Such illumination may be effected by feeding light pipes into a side of the receptacle opposite that of the plug. This approach may be sufficient for applications involving relatively small numbers, e.g., single rows of one or two receptacles, since many options exist for routing the light pipes. However, such back side receptacle lighting tends to become increasingly cumbersome and expensive as the density of receptacles increases, such as in devices that employ multiple stacked rows of receptacles.

Thus, a need exists for an improved status indication system for stacked and other configurations of multi-receptacle receptacle assemblies.

SUMMARY

One aspect of the present invention includes a stacked, multi-receptacle modular RJ-XX interface with integral optical indication. The interface includes a plurality of modular plugs having leading and trailing portions fabricated from an optically transmissive material, and a module having first and second rows of stacked receptacles. The stacked receptacles are defined by wall portions extending from a front plane to an end wall. The module is superposed with a circuit board to define a footprint thereon, and the receptacles are each sized and shaped to releasably receive the leading portion of a modular plug therein. A plurality of light pipes extend from a proximal end coupled to each receptacle, to a distal end coupled to a light source. The light pipes associated with the second row of receptacles are located within the footprint of the module. The proximal end of each light pipe is positioned to radiate light onto the leading portion of a plug located in the receptacle, the plug being configured to transmit the light from the leading portion to the trailing portion, so that the trailing portion serves as an integral optical indicator. An actuator is configured to selectively operate the light pipes.

Another aspect of the invention includes a modular receptacle assembly having integral optical indication. The receptacle assembly includes a module having a receptacle disposed therein, the receptacle defined by wall portions extending from a front plane to an end wall. The receptacle is sized and shaped to releasably receive, in an insertion direction, a leading portion of a modular plug therein. The module has a footprint in a plane parallel to the insertion direction. A light pipe has a proximal end and a distal end, and is disposed in the footprint of the module. The proximal end is coupled to the receptacle, and the distal end is coupled to a light source. The proximal end is configured to radiate light onto the leading portion of a plug disposed within said receptacle. An actuator is configured to selectively operate the light pipe.

A still further aspect of the invention includes a modular receptacle assembly with integral optical indication. The receptacle assembly includes a plurality of wall portions extending from a front plane to an end wall, the wall portions and end wall defining a plurality of stacked receptacles each sized and shaped to releasably receive a leading portion of a modular plug therein. At least one light pipe has a proximal end and a distal end, the proximal end being coupled to the receptacle, and the distal end extending from the receptacle to a light source. The light pipe is located so that it is free of the front plane. The proximal end of the light pipe is positioned to that it radiates light into the receptacle.

Another aspect of the invention is a method of providing status indication for a multi-receptacle modular RJ-45 receptacle assembly. The method includes providing a plurality of modular plugs having leading and trailing portions fabricated from an optically transmissive material, and providing a plurality stacked receptacles having wall portions extending from a front plane to an end wall, the receptacles each sized and shaped to releasably receive the leading portion of a modular plug therein. The method also includes utilizing a plurality of light pipes each having a proximal end and a distal end, coupling at least one of the proximal ends to each receptacle, extending the distal ends to a light source, and maintaining the light pipes free of the front plane. Additional aspects of this method include locating each proximal end to radiate light onto the leading portion of a plug disposed therein, and using an actuator to selectively operate the light pipes, wherein light is selectively transmitted from the leading portion to the trailing portion, so that the trailing portion serves as an integral optical indicator.

Another aspect of the invention includes a stacked, multi-receptacle modular receptacle assembly having integral optical indication. The receptacle assembly includes a module having a plurality of stacked receptacles, the module being superposed with a circuit board. Each of the receptacles are defined by wall portions extending from a front plane to an end wall. The stacked receptacles are each sized and shaped to releasably receive a leading portion of a modular plug therein. A series of light pipes each have a proximal end and a distal end, with the proximal ends each coupled to a receptacle, and the distal ends coupled to at least one light source. Each proximal end is configured to radiate light onto the leading portion of a plug located therein. At least one of the light pipes are located between the module and the circuit board. An actuator is configured to selectively operate the light pipes.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIG. 3 is a view similar to that of FIG. 1, of portions of an embodiment of the present invention;

FIG. 4 is a view taken along 4—4 of the FIG. 3, with plugs disposed therein;

DETAILED DESCRIPTION

Figure 1:
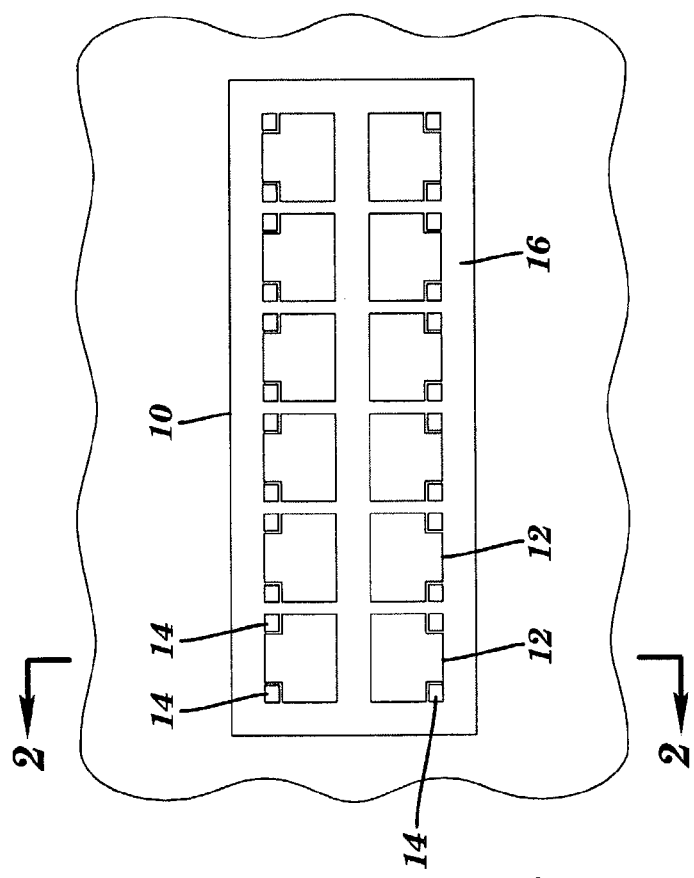
FIG. 1 is a front elevational view of a receptacle assembly and display of the prior art.
Figure 2:
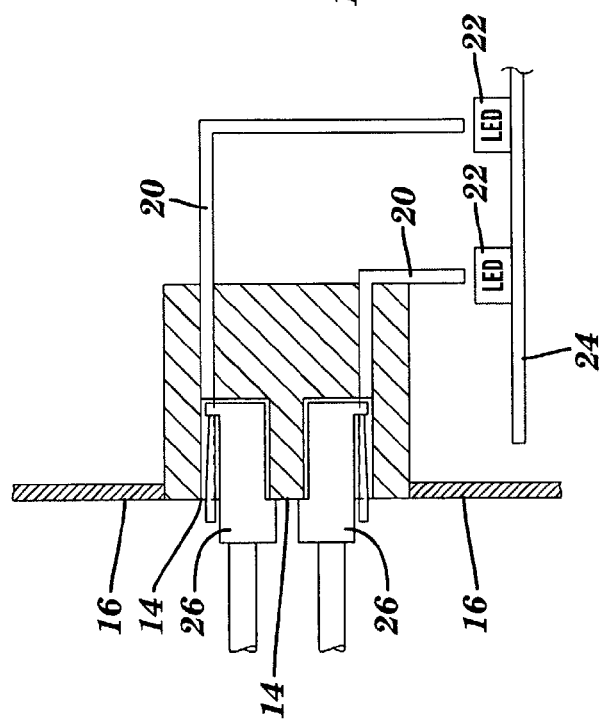
FIG. 2 is a view taken along 2—2 of FIG. 1.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Referring to Figures, embodiments of the present invention are shown. As shown in FIGS. 4–7, an embodiment of the present invention includes a multiple receptacle RJ-45 receptacle assembly having a light pipe that extends from a proximal end disposed within each receptacle, to a distal end disposed at a remote light source. The light pipe advantageously illuminates the interior of the receptacle, without the need for locating LEDs or other electrically powered light sources in close proximity to the receptacle. Such illumination may be used to facilitate proper plug insertion, while the remote location of the light source effectively prevents electrical noise associated with the light source from disrupting electrical signals passing between the plug and receptacle.

Moreover, in particular embodiments, the proximal ends of the light pipes are configured to radiate light onto the leading ends or tip portions of optically transmissive modular RJ-45 plugs when the plugs are coupled to the receptacle assembly. The light then travels through the transmissive (e.g., transparent or translucent) plugs, which themselves serve as light guides, to illuminate the trailing portion of the plug. In this manner, the trailing portion of the plug itself serves as an integral optical indicator or display. This integral indicator may be used for any desired purpose, such as to convey conventional status information (i.e., to serve as integral status lights), which eliminate the need for discrete LEDs or light pipe displays (light boards), in the face plane of the receptacle assembly.

As also shown, in desirable embodiments, the light pipes are configured to illuminate the upper row of receptacles via their end or side walls, while the lower row is illuminated via their lower side walls. This configuration advantageously provides a compact, modular implementation that illuminates both rows without unduly compromising the structural integrity of receptacle assemblies. This configuration also advantageously enables upper rows of stacked receptacles to be illuminated without increasing the size of the footprint relative to that of a single row. This aspect enables this embodiment to be conveniently scaled to large numbers of receptacles.

Additional advantages of these embodiments include reducing receptacle assembly body size, and allowing greater flexibility in what and where information is displayed to the user. They also allow flexibility in locating the light sources. For example, the light sources may be located on the main board, on a daughter board, on a riser card, or they may be shielded separately within the receptacle assembly housings. These embodiments also tend to make it easier for a user to identify which receptacle is being indicated by a particular status light. Another advantage is that the light indicator, being integrated into a trailing portion of the plug, effectively moves the indicator away from the front (face) plane of the receptacle assembly, where the indicators may be obscured by cable assemblies. In addition, embodiments may include light pipes fabricated as discrete portions or sections, which may be fabricated independently of one another to facilitate manufacture and/or so that particular portions may be provided with relatively small cross-sections, such as to extend through small openings in EMI shielding, e.g., to minimize EMI 'leaks'.

Where used in this disclosure, the term 'axial' when used in connection with an element described herein, refers to a direction relative to the element, which is substantially parallel to the direction of insertion of the plug into a receptacle of embodiments of the present invention. Similarly, the term 'transverse' refers to a direction substantially orthogonal to the axial direction. The term 'transverse cross-section' refers to a cross-section taken along a plane oriented substantially orthogonally to the axial direction. The terms 'lower' and 'upper' refer to locations relatively proximal and distal, respectively, from a circuit board 24.

Referring now to the Figures, various aspects and embodiments of the present invention will be more thoroughly described.

Turning to FIGS. 3 & 4, an embodiment of the present invention includes a multi-receptacle receptacle assembly 110 having a series of receptacles 112 spaced along a face plane 116. One or more light pipes 120 extend from proximal ends 130 disposed within an interior portion of each receptacle 112, to distal ends 132 disposed in operative (i.e., light-coupling) engagement with a light source (e.g., LED) 22. In this configuration, light pipes 120 remain free from face plane 116.

As will become apparent in light of the discussion hereinbelow, this configuration advantageously provides each receptacle with optical indication, e.g., for status indication, without taking up valuable surface area of face plane 116. For example, light pipes 120 may be selectively operated by an actuator 150 (FIG. 7) to illuminate the interior of desired receptacles 112 to indicate that the receptacles are ready to receive a plug. Actuator 150 may include substantially any device, process, or function configured to selectively enable light from a source to pass through a light pipe(s) to illuminate a receptacle 112, either by selectively supplying power to the light source(s), or by selectively blocking and unblocking (and/or diverting) the light as it passes through the light pipe(s), e.g., by use of a discrete switch array 144 as discussed below. Actuator 150 may thus include, but is not limited to, a CPU, ASIC, network processor, state machine, digital or analog processing function, discrete logic or manual switch. This selective actuation may be particularly useful during initial setup of a computer or server system, in which the system may be configured to automatically illuminate a particular receptacle, and then generate an instruction to the user to insert a particular plug into the illuminated receptacle.

Figure 6:
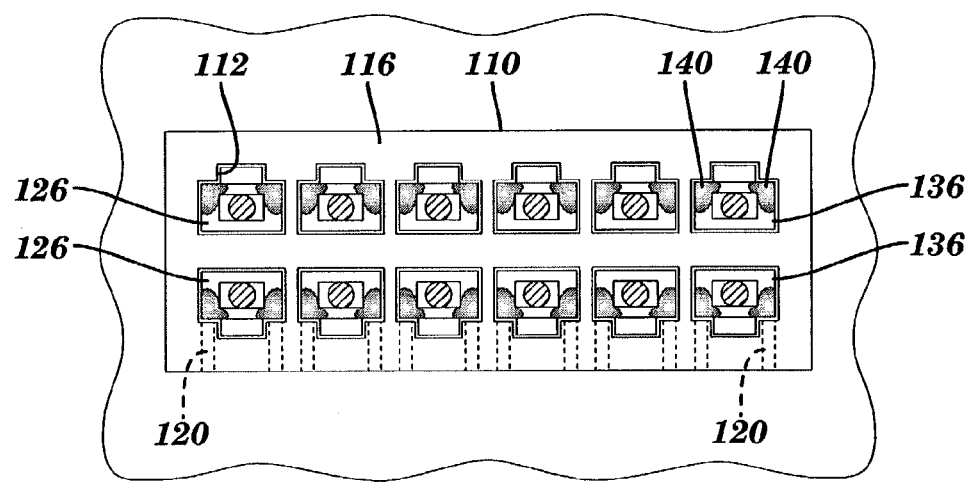
FIG. 6 is a view similar to that of FIG. 3, during operation thereof, including plugs disposed therein.

Additionally, and/or alternatively, as best shown in FIG. 4, proximal ends 130 may be disposed within receptacle 112, within the range of light transmission to leading portion 134 of each plug 126. Such optical close-coupling optionally enables the plugs 126 to be used to provide additional functionality. For example, many conventional plugs 126 are fabricated from an optically transmissive (e.g., transparent or translucent) polymeric material. The close-coupling of such a plug with proximal ends 130 advantageously enables the plug itself to function as a light guide, to effectively illuminate trailing portion 136 thereof, such as shown in FIG. 6 described below.

Moreover, proximal ends 130 may be disposed at nominally any angle with respect to receptacles 112 and/or plugs 126, to advantageously enable light pipes 120 to be routed through the receptacles 112 in the most convenient manner. For example, in the embodiment shown, multi-receptacle receptacle assembly 110 includes a 'stacked' arrangement having two rows of receptacles that may be superposed as a single unit with a circuit board 24. In such a configuration, it may be convenient to route light pipes 120 as shown, i.e., with proximal ends 130 disposed respectively axially and transversely to upper and lower receptacles 112.

This transverse arrangement (or oblique, as discussed below) of the lower light pipe advantageously reduces the extent of penetration into receptacle assembly 110, to minimize any associated adverse effects on the structural integrity of the receptacle assembly. This configuration also advantageously enables the transverse or oblique light pipes 120 and/or their associated LEDs 22, to be conveniently located directly beneath the receptacle assembly 110, i.e., within the 'footprint' of the receptacle assembly relative to a plane parallel to board 24 and/or parallel to the insertion direction d (FIG. 4) of a plug into the assembly. Such a configuration thus serves to illuminate the lower receptacles 112 without increasing the footprint of the receptacle assembly. Moreover, although the upper receptacles 112 are shown being illuminated by axially extending proximal ends 130, these ends may alternatively be disposed obliquely or transversely, such as shown in phantom at 130'. Their distal ends 132' may also be optically coupled to LEDs 22 disposed beneath the receptacle or receptacle assembly. This alternative arrangement advantageously enables the upper receptacles 112 to be illuminated in a manner similar to that of the lower receptacles, without increasing the overall footprint of the receptacle assembly.

Figure 5:
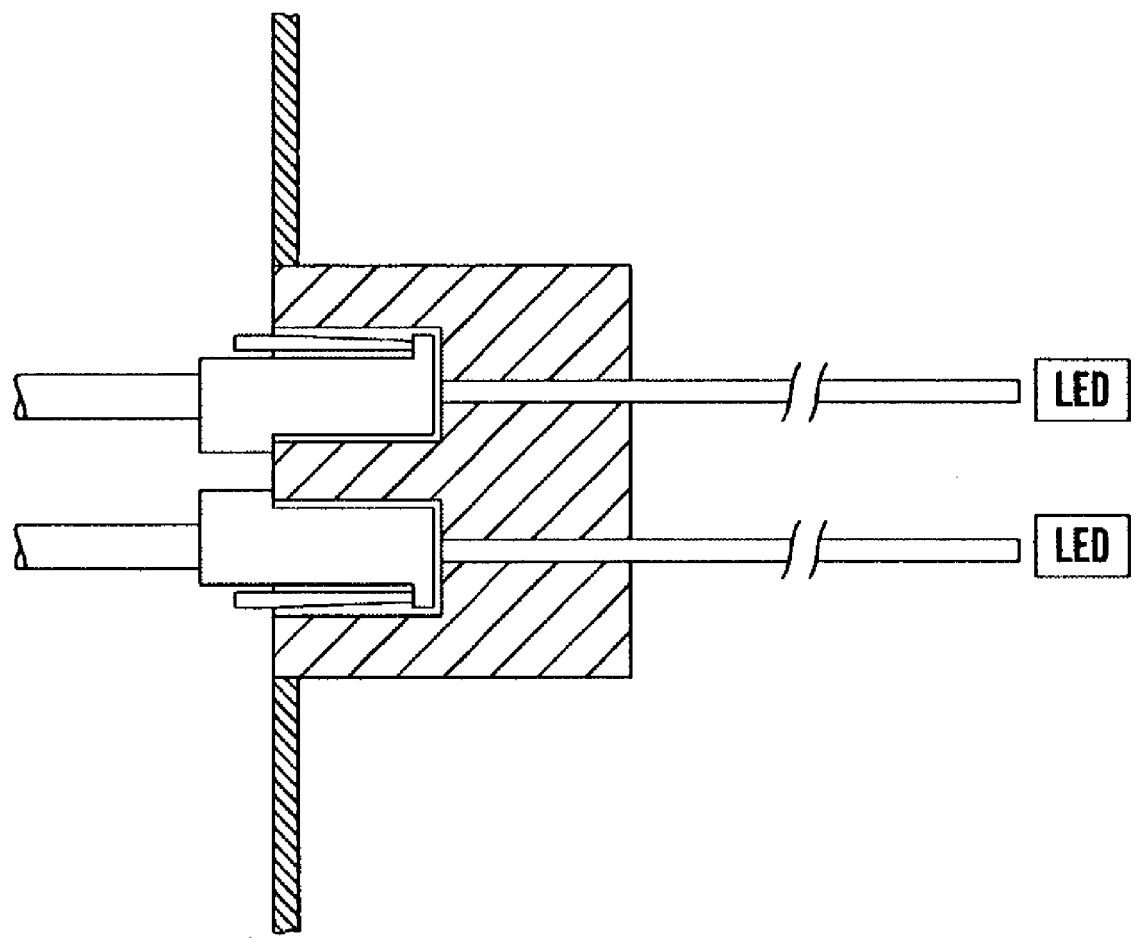
FIG. 5 is a view similar to that of FIG. 4, of an alternate embodiment of the present invention.

The skilled artisan will also recognize that proximal ends 130 may be all oriented axially, such as shown in FIG. 5, without departing from the spirit and scope of the present invention.

Turning now to FIG. 6, as mentioned above, plugs 126, and in particular, trailing portions 136 thereof, are illuminated by the light pipes 120, so that plugs 126 are effectively provided with integral optical indicator(s) 140.

These indicators 140 may be used for any desired purpose. For example, indicators 140 may be configured to display red or green light as commonly used to indicate the status of a connection. Red may be used to indicate that plug 126 has been properly inserted into receptacle 112, while green may be displayed to indicate that data is being transferred through the receptacle/plug combination.

This provision of indicators 140 on plugs 126 advantageously frees up valuable area on face plane 116, which, for example, may be used for additional receptacles. Those skilled in the art will recognize that as electronic components tend to decrease in size over time, and greater processing capabilities are packaged in smaller enclosures, the need to increase receptacle density in these enclosures will tend to increase.

Moreover, although plugs 126 may be modified to enhance or add to the functionality provided by light pipes 120, in the embodiments shown, indicators 140 may be advantageously provided using unmodified, conventional transparent or translucent plugs 126.

Figure 7:
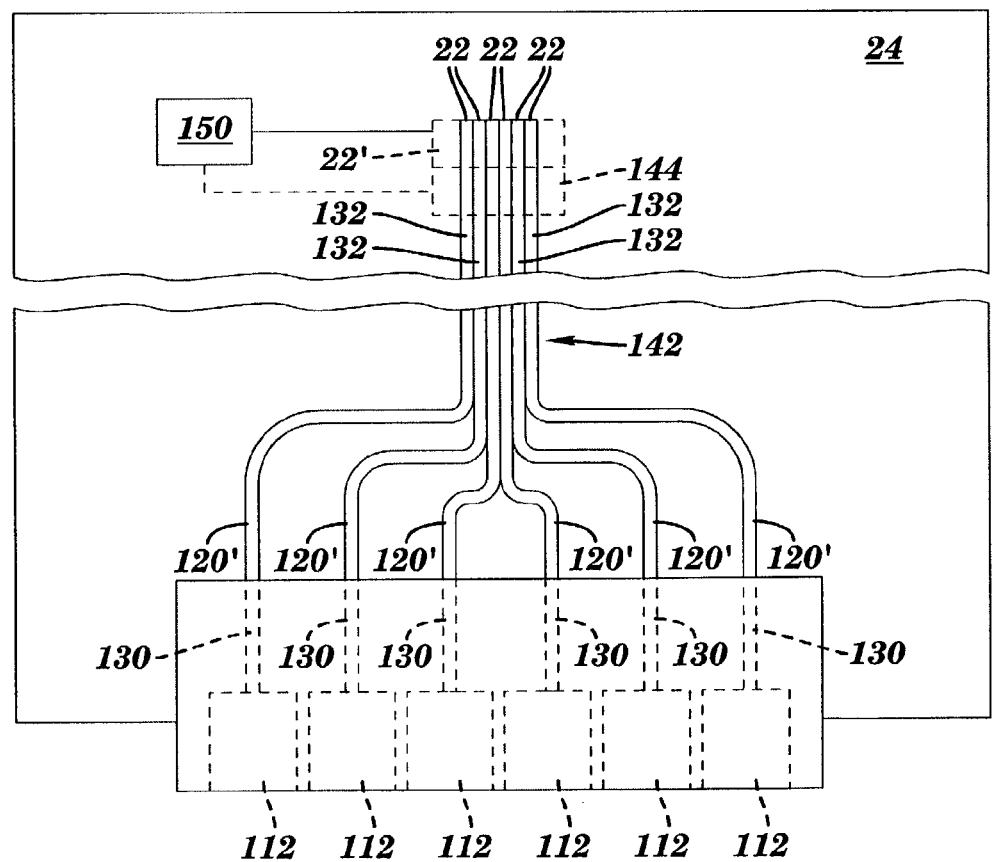
FIG. 7 is a plan view, with portions shown in phantom, of portions of an alternate embodiment of the present invention.

Turning now to FIG. 7, in an alternate embodiment, light pipes 120', extending from their proximal ends 130, may be ganged together to effectively form one or more multi-channel fiber optic cables 142 terminating at distal ends 132. Use of such a cable 142 advantageously enables the light source(s) 22 to be located remotely from the receptacle assembly 110. For example, as shown, light source(s) 22 may be disposed on an opposite side of circuit board 24 from receptacle assembly 110. Such remote placement tends to mitigate the adverse effect of electromagnetic noise commonly associated with LEDs, adds flexibility to the topology of circuit board 24, and reduces congestion on board 24, by effectively permitting light source(s) 22 to be located in nominally any available space thereon. This ability may be particularly useful in the event embodiments of the present invention are incorporated into computer systems having relatively congested circuit board topologies.

As also shown, each distal end 132 may be optically coupled to a single light source 22. This arrangement conveniently enables each optical indicator 140 (FIG. 6) to be individually illuminated, simply by actuating its associated light source 22, such as via actuator 150 coupled thereto.

Alternatively, as shown in phantom, a single light source 22' may be configured to supply light simultaneously to a plurality of distal ends 132 via a switch array 144. This switch array 144, in turn, may be operated by actuator 150, which may, for example, include a processor. In such an embodiment, the light generated by light source 22' is selectively blocked or fed to light pipes 120' by switch array 144 in response to signals from actuator 150. This alternative arrangement may save space and/or cost by requiring fewer LEDs 22. Switch array 144 may include any number of optical switching devices known in the art, including, but not limited to those incorporating liquid crystal or MEMs (Micro Electro-Mechanical) technologies, whether electrically or optically operated.

Moreover, although embodiments of 2 rows by 6 connectors have been shown and described, the skilled artisan should recognize that any number of connectors, in nominally any configuration M×N may be provided without departing from the spirit and scope of the present invention. Those skilled in the art should further recognize that any number of light pipes and/or light sources (e.g., LEDs) may be optically coupled to each cavity without departing from the spirit and scope of the invention.

Additional embodiments are shown and described with respect to FIGS. 8A–12B. For example, referring to FIGS. 8A–8C, a plurality of flexible light pipes 120' may be fed to a receptacle assembly 210, such as through back panel 170 thereof. In the embodiment shown, each receptacle 112 with a plurality of light pipes 120'. The light pipes 120' may each be coupled to their own light source, or alternatively, as shown in FIG. 8C, a plurality of light pipes 120' may share a light source 22, to feed light to multiple receptacles simultaneously. The light pipes 120' may be fed directly to multiple receptacles 112 as shown, or in the alternative, a switch array 144 and actuator 150 (FIG. 7) may be used to selectively actuate individual light pipes 120'. As shown in FIGS. 9A & 9B, larger numbers of light pipes 120' may be fed to each receptacle 112, to provide for still greater indication functionality. Although four light pipes per receptacle are shown, substantially greater numbers of light pipes may be used per receptacle, such as in the event light pipes of relatively small diameter are used to provide sufficient mechanical clearance.

Figure 10B:
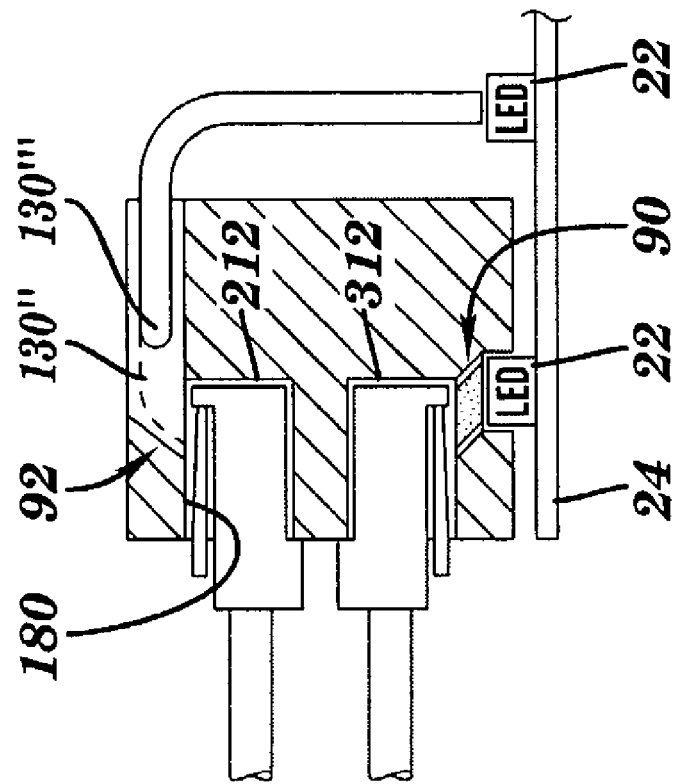
FIGS. 10A & 10B are front and side elevations of yet another embodiment of the present invention.
Figure 10A:
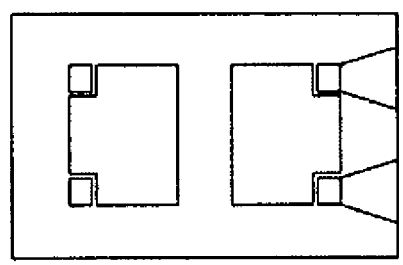

Turning now to FIGS. 10A & 10B, in a configuration similar to that of FIG. 4, proximal end 130" of light pipe 120 may be coupled (as shown in phantom) to a side wall 180 of an upper receptacle 212. Lower receptacle 312 may be supplied with optical signals via a channel, hole or similar recess 90 extending from a light source 22 to the receptacle, thus obviating the need for a light pipe.

Optionally, such as in the event it may not be practical or otherwise feasible to extend light pipe 120 all the way to upper receptacle 212, proximal end 130''' of the light pipe may be spaced from, and/or provided with a convex or other generally diffusive configuration, to diffuse the light towards the receptacle 212. In a variation of this embodiment, a reflective surface 92 may be provided to direct light emitted from the proximal end 130", 130''' of light pipe 120 into receptacle 212. The reflectivity of surface 92 may be provided by any convenient means, such as by a coating, metal/foil component or layer, by applying an appropriate surface finish to portion(s) of receptacle assembly 110 leading from light pipe 120 into receptacle 212, or by providing such portion(s) with an appropriate index of refraction.

Figure 11A:
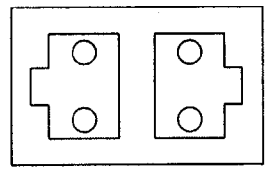
FIGS. 11A, 11B & 11C are front, side, and rear elevations of another embodiment of the present invention.
Figure 11B:
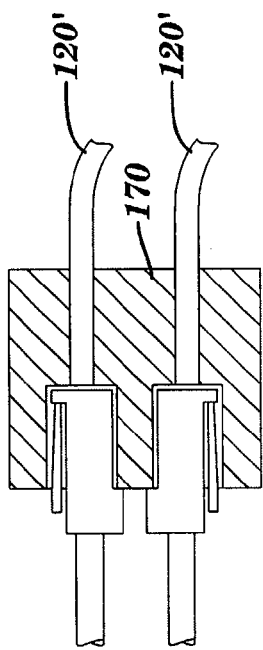
Figure 11C:
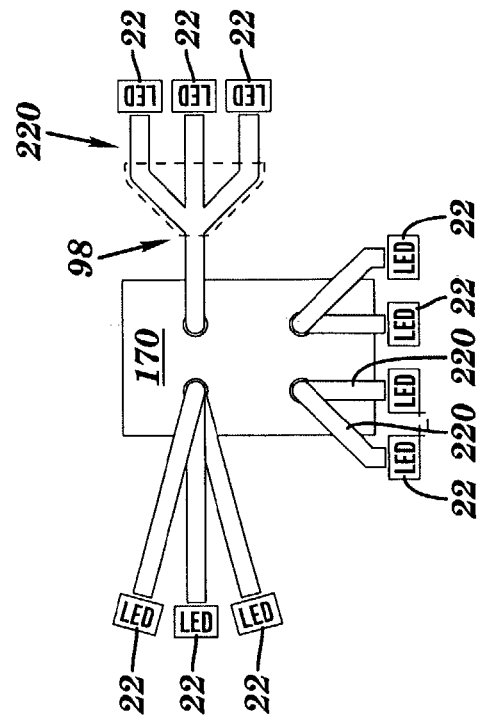

Turning now to FIGS. 11A–11C, light pipes 220 (rigid, flexible, or combinations thereof) may be configured to gather light from multiple light sources 22 (FIG. 11C). Such a configuration enables many sources 22 to be fed to a single receptacle or display location 140 (FIG. 6). This approach enables many different colors to be displayed. For example, in this embodiment, discrete blue, red and green colored LEDs 22 may each be coupled to a single display location 140. These colored LEDs may then be selectively actuated, e.g., as discussed hereinabove, in nominally any combination and/or intensity to display a wide range of colors or hues, for a wide range of signal output.

Figure 12A:
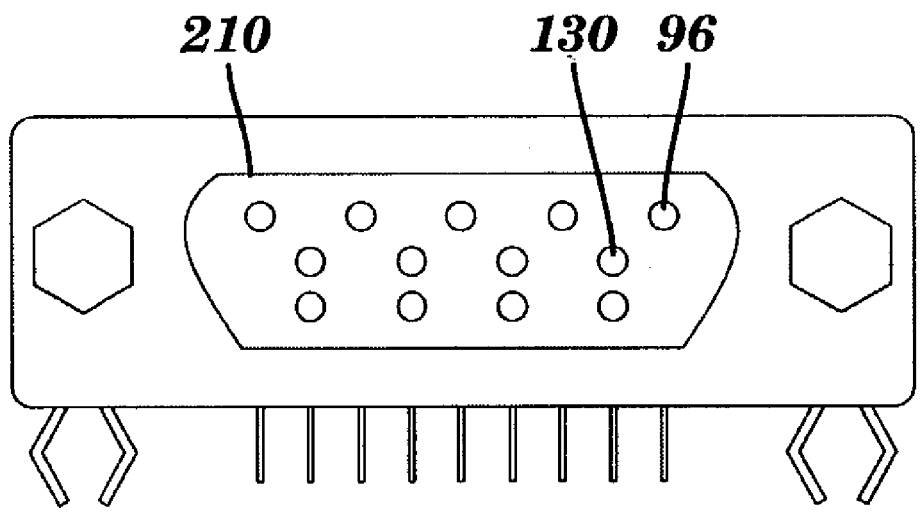
FIGS. 12A & 12B are front and side elevations of a still further embodiment of the invention.
Figure 12B:
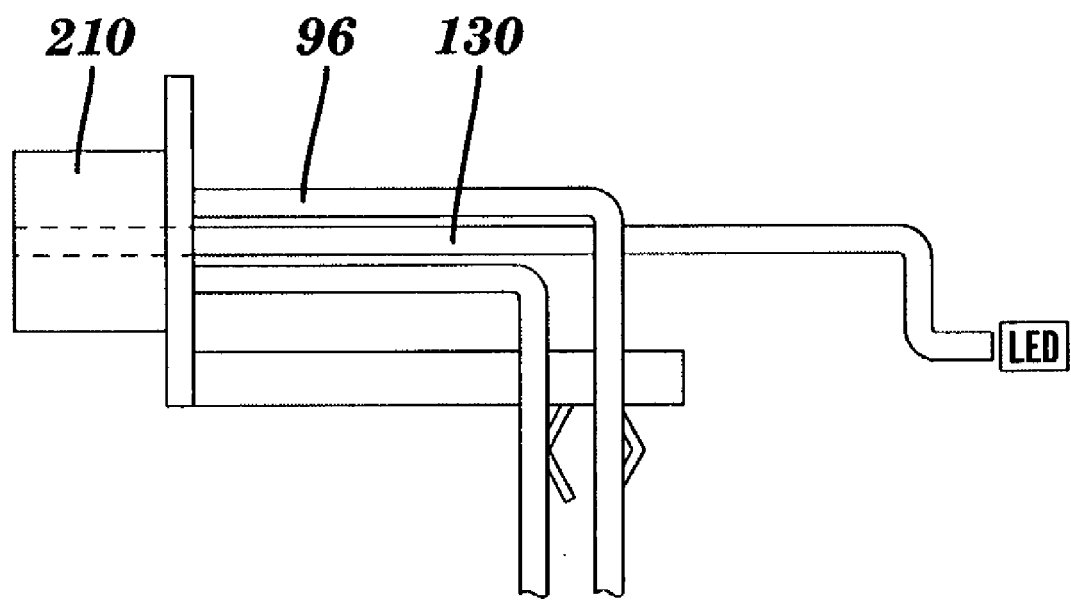

As shown in FIGS. 12A & 12B, proximal end 130 of a light pipe 120 may be disposed to feed/diffuse light to the pin field (e.g., between pins 96) and into the cavity of a DSUB type receptacle assembly 210, or into the mating connector (e.g., plug), not shown. Alternatively, light may be fed or piped through pin field via a void created by removing one or more pins 96.

Figure 8C:
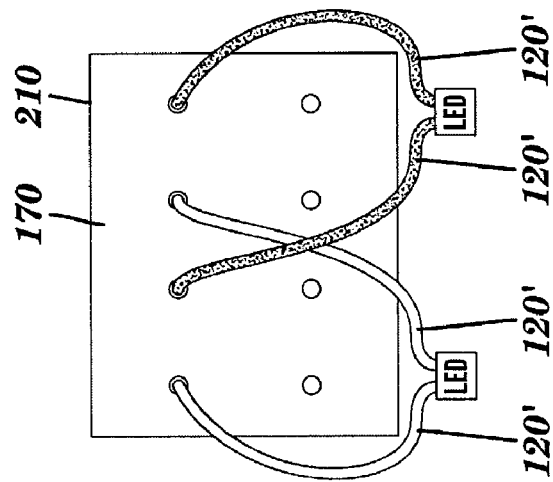
FIG. 8C is a rear elevational view of the embodiment of FIGS. 8A & 8B, with light pipes installed.
Figure 8B:
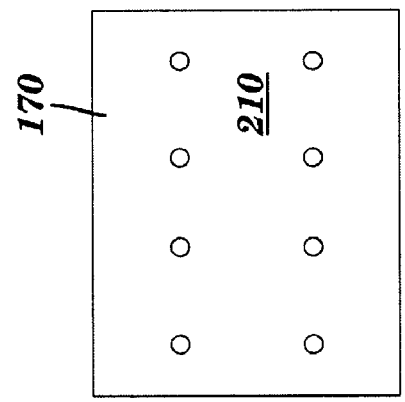
FIGS. 8A & 8B are front and rear elevational views of portions of an alternate embodiment of the present invention.

In any of the embodiments discussed herein, the light pipes may be fabricated as unitary components, i.e., of nominally the same construction at various points along their lengths. Alternatively, the light pipes may include multiple sections for ease of construction and/or to enhance particular (e.g., light propagating) properties thereof. For example, the distal (light gathering) end may be fabricated as a discrete section sized and shaped to gather light from several light sources 22, e.g., by providing it with a junction 98 (FIG. 1C), which may be in the form of a frusto-conical (cone) shape (shown in phantom), which may include multiple lens on the base thereof, and/or a multi-fiber furcation as shown, to capture and aggregate reflected or refracted light from multiple sources. A medial portion of the light pipe may be fabricated as a discrete conduit section, which may be flexible to facilitate routing around pins, fasteners, and other components, such as shown in FIG. 8C.

Figure 8A:
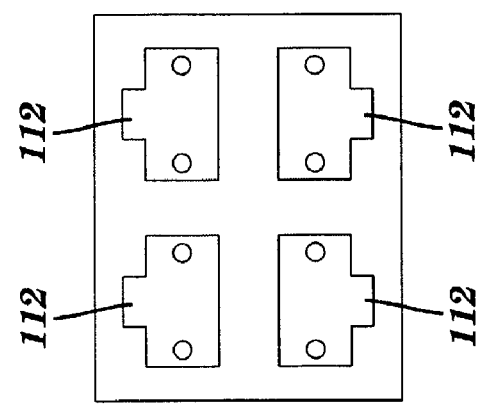
Figure 9B:
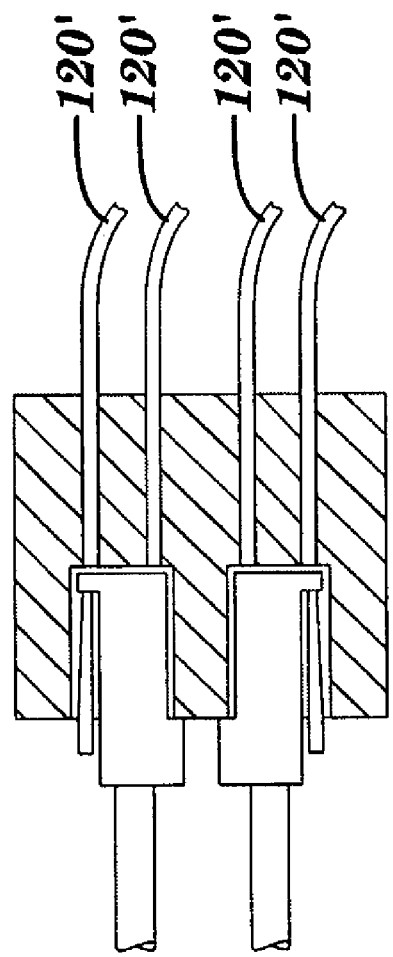
FIGS. 9A & 9B are front and side elevational views of another embodiment of the present invention.
Figure 9A:
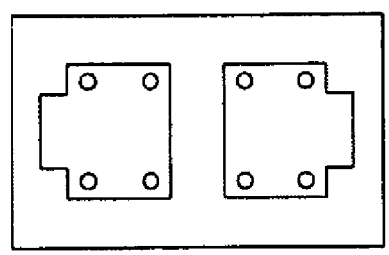

The proximal end 130, 130', 130", 130''' of the light pipe may be fabricated as a discrete diffusion section, to transmit light in a particular direction or directions to provide greater flexibility as to placement thereof relative to the receptacle, such as discussed above with respect to proximal end 130" of FIG. 10B. The diffusion section may be provided with various configurations, including a junction 98 (FIG. 11C) as discussed above with respect to the distal end, but inverted to distribute light to two or more integral displays. In addition, or in the alternative, the diffusion section may be angled, or provided with a convex surface, such as discussed with respect to FIG. 10B, and may be polished or frosted as desired. The proximal ends themselves may also serve as one or more display surfaces, e.g., by suitably sizing, shaping, and locating it relative to the receptacle, so that it is visible to the user prior to inserting a plug therein, such as shown in FIG. 8A. The diffusion section may also be configured to combine several conduit sections to facilitate use of a plurality of sources 22, such as described above with respect to FIG. 11C.

Moreover, each of the sections of a sectional light pipe may themselves be fabricated from one or more components. For example, each section may include one or more fibers or light guides. The sections may also be combined with integral light sources. The diffusion section may be molded or otherwise fabricated into a translucent receptacle assembly housing so that it may glow. For example, the housing may glow one color to enable a user to easily find the appropriate receptacle, and may change color when a plug is detected as being inserted into the receptacle. Different colors may be used for different plug types inserted. Particular colors may flicker at predetermined rates to indicate presence, and/or rate of data flow therethrough.

Also, the various sections of the sectional light pipes may be added at different stages of board construction to facilitate various manufacturing techniques. In the event a shielded connecter is used, one of the sections (e.g., the conduit section) may be provided with a relatively thin diameter to minimize gaps or 'holes' in the receptacle assembly EMI shielding.

Examples of light sources 22 that may be used in any of the foregoing embodiments, include, but not limited to: LED, OLED (Organic), Incandescent, Laser, VCSEL (Vertical-Cavity Surface-Emitting Laser), florescent, and neon devices.

Although the foregoing description has included embodiments using some particular receptacle assembly styles, the skilled artisan should recognize that the present invention is not so limited. Receptacle assemblies of nominally any style or configuration may be used without departing from the spirit and scope of the present invention. Examples of suitable receptacle assembly styles include, but are not limited to: RJ-XX (e.g., RJ21, RJ45, RJ28, RJ11); MMJ; keyed; Compu-shield™; Krone™; Dsub (e.g., D9, D15, D25, D37, D50); Hybrids; Leaf style (e.g., Centronics™, USB, Infiniband/10Genet); and Fiber receptacle assemblies (e.g., MTRJ, LC, SC, ST, FDDI).

The skilled artisan should recognize that although embodiments discussed herein contemplate the transmission of electromagnetic energy within the visible range of the electromagnetic spectrum, the skilled artisan should recognize that non-visible portions of the spectrum, such as the infrared or ultraviolet portions, may be utilized without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A stacked, multi-receptacle modular RJ-XX interface with integral optical indication, the interface comprising:
   a plurality of modular plugs having leading and trailing portions fabricated from an optically transmissive material;
   a assembly having first and second rows of stacked receptacles;
   the stacked receptacles defined by wall portions extending from a front plane to an end wall;
   the assembly being superposed with a circuit board to define a footprint thereon;
   the receptacles each sized and shaped to releasably receive the leading portion of a modular plug therein;
   a plurality of light pipes extending from a proximal end coupled to each receptacle, to a distal end coupled to a light source;
   light pipes coupled to the second row of receptacles, at least one of the light pipes being disposed entirely within the footprint of the assembly;
   the proximal end of each light pipe being disposed to radiate light onto the leading portion of a plug disposed in the receptacle;
   the plug being configured to transmit the light from the leading portion to the trailing portion, wherein the trailing portion serves as an integral optical indicator; and
   an actuator configured to selectively operate the light pipes.

2. The interface of claim 1, wherein proximal ends are coupled to the end walls of the first row of receptacles; and proximal ends are coupled to a wall portion of the second row of receptacles.

3. The interface of claim 1, wherein the light pipes are free of the front plane.

4. A modular receptacle assembly having integral optical indication, the receptacle assembly comprising:
   a module having a receptacle disposed therein;
   the receptacle sized and shaped to releasably receive, in an insertion direction, a leading portion of a modular plug therein;
   the receptacle having a footprint in a plane parallel to the insertion direction;
   a light pipe having a proximal end and a distal end;
   the light pipe being disposed entirely in the footprint of the receptacle;
   the proximal end coupled to the receptacle;
   the distal end coupled to a light source;
   the proximal end configured to radiate light onto the leading portion of a plug disposed within said receptacle; and
   an actuator configured to selectively operate the light pipe.

5. The receptacle assembly of claim 4, wherein the module comprises a plurality of receptacles.

6. The receptacle assembly of claim 5, wherein the module comprises a plurality of stacked receptacles.

7. The receptacle assembly of claim 6, wherein the module is superposed with the circuit board.

8. The receptacle assembly of claim 6, wherein the stacked receptacles are disposed in first and second rows.

9. The receptacle assembly of claim 8, wherein light pipes coupled to the first row are disposed within the footprint of the module.

10. The receptacle assembly of claim 9, wherein light pipes coupled to the second row are disposed within the footprint of the module.

11. The receptacle assembly of claim 5, comprising a plurality of light pipes.

12. The receptacle assembly of claim 5, comprising a plurality of light sources.

13. The receptacle assembly of claim 4, wherein the light pipe is free of the front plane.

14. The receptacle assembly of claim 4, wherein the light source is disposed within the footprint.

15. The receptacle assembly of claim 4, comprising a plurality of light pipes.

16. The receptacle assembly of claim 15, wherein said receptacle comprises an RJ-XX receptacle.

17. The receptacle assembly of claim 16, comprising a plurality of stacked RJ-XX receptacles.

18. The receptacle assembly of claim 4, wherein the module is superposed with a circuit board, and the light pipe is disposed between the module and the circuit board.

19. The receptacle assembly of claim 4, comprising a plug disposed within the receptacle.

20. The receptacle assembly of claim 19, wherein a trailing portion of the plug is configured for being illuminated by the light radiated onto the leading portion thereof.

21. The receptacle assembly of claim 20, wherein the plug composes a light guide.

22. The receptacle assembly of claim 21, wherein the plug is optically transmissive.

23. The receptacle assembly of claim 22, wherein the plug is optically translucent.

24. The receptacle assembly of claim 20, wherein the light pipe is configured to convey status information, and the trailing portion of the plug comprises an integral optical indicator.

25. A modular receptacle assembly having integral optical indication, the receptacle assembly comprising:
a module having a receptacle disposed therein;
the receptacle sized and shaped to releasably receive, in an insertion direction, a leading portion of a modular plug therein;
the module having a footprint in a plane parallel to the insertion direction;
a light pipe having a proximal end and a distal end;
the light pipe being disposed in the footprint of the module;
the proximal end coupled to the receptacle;
the distal end coupled to a light source;
the proximal end configured to radiate light onto the leading portion of a plug disposed within said receptacle; and
an actuator configured to selectively operate the light pipe;
wherein the light pipes comprise a multi-fiber, fiber optic cable.

26. The receptacle assembly of claim 4, wherein said proximal end is optically coupled to the receptacle.

27. A modular receptacle assembly having integral optical indication, the receptacle assembly comprising:
a module having a receptacle disposed therein;
the receptacle sized and shaped to releasably receive, in an insertion direction, a leading portion of a modular plug therein;
the module having a footprint in a plane parallel to the insertion direction;
a light pipe having a proximal end and a distal end;
the light pipe being disposed in the footprint of the module;
the proximal end coupled to the receptacle;
the distal end coupled to a light source;
the proximal end configured to radiate light onto the leading portion of a plug disposed within said receptacle;
an actuator configured to selectively operate the light pipe;
wherein said proximal end is optically coupled to the receptacle; and
wherein said proximal end is coupled to the receptacle by at least one reflective surface disposed optically between said proximal end and said receptacle.

28. A modular receptacle assembly with integral optical indication, comprising:
a plurality of stacked rows of receptacles each sized and shaped to releasably receive a leading portion of a modular plug therein, the plurality of stacked rows of receptacles having a footprint;
at least one light pipe having a proximal end and a distal end;
the proximal end being coupled to the receptacle;
the distal end extending from the receptacle to a light source;
the light pipe being free of the front plane;
the proximal end being disposed to radiate light into the receptical; and
wherein the light pipe is disposed entirely within the footprint.

29. The receptacle assembly of claim 28, wherein the proximal end is disposed to radiate light onto the leading portion of a plug disposed within the receptacle.

30. The receptacle assembly of claim 29, comprising the plug.

31. The receptacle assembly of claim 30, wherein a trailing portion of the plug is configured for being illuminated by the light radiated onto the leading portion thereof.

32. The receptacle assembly of claim 31, wherein the light pipe is configured to convey status information, and the trailing portion of the plug comprises an integral optical indicator.

33. The receptacle assembly of claim 28, further comprising an actuator configured to selectively actuate the light pipes.

34. A receptacle assembly having integral optical indication, the receptacle assembly comprising:
a module having a receptacle disposed therein;
the receptacle sized and shaped to releasably receive, in an insertion direction, a leading portion of a modular plug therein, the receptacle having a footprint;
a light pipe having at least one proximal end, at least one distal end, and a junction configured to alternately aggregate and distribute light being transmitted therethrough;
the proximal end coupled to the receptacle;
the distal end coupled to a light source;
the proximal end configured to radiate light onto the leading portion of a plug disposed therein;
the light pipe being disposed entirely in the footprint; and
an actuator configured to selectively operate the light pipe.

35. A receptacle assembly having integral optical indication, the receptacle assembly comprising:
a module having a receptacle disposed therein;
the receptacle sized and shaped to releasably receive, in an insertion direction, a leading portion of a modular plug therein;
a light pipe having at least one proximal end, at least one distal end, and a junction configured to alternately aggregate and distribute light being transmitted therethrough;
the proximal end coupled to the receptacle;
the distal end coupled to a light source;
the proximal end configured to radiate light onto the leading portion of a plug disposed therein;
an actuator configured to selectively operate the light pipe; and
wherein the junction comprises a frusto-conical portion.

36. The receptacle of claim 34, wherein said junction is configured to optically couple a plurality of light sources to a receptacle.

37. The receptacle of claim 34, wherein said module comprises a plurality of receptacles.

38. A receptacle assembly having integral optical indication, the receptacle assembly comprising:
   a module having a receptacle disposed therein;
   the receptacle sized and shaped to releasably receive, in an insertion direction, a leading portion of a modular plug therein;
   a light pipe having at least one proximal end, at least one distal end, and a junction configured to alternately aggregate and distribute light being transmitted therethrough;
   the proximal end coupled to the receptacle;
   the distal end coupled to a light source;
   the proximal end configured to radiate light onto the leading portion of a plug disposed therein;
   an actuator configured to selectively operate the light pipe;
   wherein said module comprises a plurality of receptacles; and
   wherein said junction is configured to optically couple a single light source to said plurality of receptacles.

39. A receptacle assembly having integral optical indication, the receptacle assembly comprising:
   a module having a receptacle disposed therein;
   the receptacle sized and shaped to releasably receive, in an insertion direction, a leading portion of a modular plug therein;
   a light pipe having at least one proximal end, at least one distal end, and a junction configured to alternately aggregate and distribute light being transmitted therethrough;
   the proximal end coupled to the receptacle;
   the distal end coupled to a light source;
   the proximal end configured to radiate light onto the leading portion of a plug disposed therein;
   an actuator configured to selectively operate the light pipe; and
   wherein the junction comprises a furcation.

40. A receptacle assembly having integral optical indication, the receptacle assembly comprising:
   a receptacle disposed therein;
   the receptacle sized and shaped to releasably receive a leading portion of a plug therein, the receptacle having a footprint;
   the receptacle having a pin field including a plurality of information-transmissive pin connectors disposed in spaced relation therein;
   a light pipe having a proximal end and a distal end;
   the proximal end disposed within said pin field;
   the distal end coupled to a light source;
   the proximal end configured to radiate light onto the leading portion of a plug disposed within said receptacle;
   wherein said proximal end and said distal end are both disposed within the footprint: and
   an actuator configured to selectively operate the light pipe.

41. A receptacle assembly having integral optical indication, the receptacle assembly comprising:
   a receptacle disposed therein;
   the receptacle sized and shaped to releasably receive a leading portion of a plug therein;
   the receptacle having a pin field including a plurality of information-transmissive pin connectors disposed in spaced relation therein;
   a light pipe having a proximal end and a distal end;
   the proximal end disposed within said pin field;
   the distal end coupled to a light source;
   the proximal end configured to radiate light onto the leading portion of a plug disposed within said receptacle;
   an actuator configured to selectively operate the light pipe; and
   wherein the light pipe is disposed in place of one of said pin connectors.

42. The receptacle assembly of claim 40, wherein the receptacle comprises a DSUB receptacle.

43. A receptacle assembly having integral optical indication, the receptacle assembly comprising:
   a receptacle disposed therein;
   the receptacle sized and shaped to releasably receive a leading portion of a plug therein;
   the receptacle having a pin field including a plurality of information-transmissive pin connectors disposed in spaced relation therein;
   a light pipe having a proximal end and a distal end;
   the proximal end disposed within said pin field;
   the distal end coupled to a light source;
   the proximal end configured to radiate light onto the leading portion of a plug disposed within said receptacle;
   an actuator configured to selectively operate the light pipe; and
   wherein the light pipe is interposed between said pin connectors.

44. A stacked, multi-receptacle modular receptacle assembly having integral optical indication, the receptacle assembly comprising:
   a plurality of stacked receptacles;
   the stacked receptacles being superposed with a circuit board;
   the stacked receptacles each sized and shaped to releasably receive a leading portion of a modular plug therein;
   a plurality of light pipes each having a proximal end and a distal end;
   the proximal ends each being coupled to a receptacle;
   the distal ends coupled to at least one light source;
   each proximal end being configured to radiate light onto the leading portion of a plug disposed therein;
   at least one of the light pipes disposed entirely between the stacked receptacles and the circuit board; and
   an actuator configured to selectively operate the light pipes.

45. A method of providing status indication for a modular receptacle assembly, the method comprising:
   (a) providing a plurality of modular plugs having leading and trailing portions fabricated from an optically transmissive material;
   (b) providing a plurality stacked receptacles each sized and shaped to releasably receive the leading portion of a modular plug therein, said plurality of receptacles having a footprint in a plane parallel to an insertion direction;
   (c) utilizing a plurality of light pipes each having a proximal end and a distal end;
   (d) coupling at least one of the proximal ends to each receptacle;

(e) extending the distal ends to a light source;
(f) maintaining the light pipes free of the front plane;
(g) disposing the light pipes entirely within the footprint of the plurality of receptacles;
(h) disposing each proximal end to radiate light onto the leading portion of a plug disposed therein;
(i) disposing an actuator to selectively operate the light pipes;

wherein light is selectively transmitted from the leading portion to the trailing portion, so that the trailing portion serves as an integral optical indicator.

* * * * *